2,871,132

GLAZING COMPOSITION FOR STRUCTURAL CLAY PRODUCTS AND PROCESS FOR MAKING SAME

Floyd A. Hummel, University Park, Pa., assignor to Glen-Gery Shale Brick Corporation, Reading, Pa., a corporation of Pennsylvania No Drawing. Application April 7, 1958
Serial No. 726,643

10 Claims. (Cl. 106—45)

This invention relates to a glazing composition for structural clay products and, more particularly, to a colored glazing composition which, when applied to structural clay products such as building bricks, structural tile and the like, will permanently adhere thereto and form a smooth, clear, glossy, vitrified colored film which does not craze during its application or when exposed to ordinary atmospheric conditions including heat, cold, moisture and the like.

While satisfactory glazing compositions for dinnerware and artware have been known, and many attempts have been made to provide satisfactory glazing compositions for structural clay products, these attempts have met with little apparent success. Among the principal difficulties have been the tendency of the vitreous film to craze, i. e., to form numerous minute cracks on the surface of the film and also the tendency to form a plurality of minute "pinholes" on or below the surface of the film, usually caused by escaping gases during the application of the glaze composition to the structural clay product. Another difficulty has been in obtaining a glazing composition which can be applied to a structural clay product and be fired thereon within the temperature range of 1700° F. to 1950° F.

Unless the glazing composition forms a smooth, glossy, clear, continuous vitrified film on the surface of structural clay products, such as bricks or tiles, and this film is not susceptible to crazing when subjected to atmospheric elements, the glazed bricks or tiles become unsatisfactory for general commercial use, such as for exterior walls of a building. The reason for this is evident. Crazing of the glaze, no matter how minor it may be, produces a plurality of minute cracks on the surface of the glaze, which permit the entrance of moisture therein. Subjecting the glaze to freezing temperatures results in the freezing and expansion of the moisture which in turn causes consequent flaking of the glaze composition. Within a short period of time, a building having one or more walls formed of glazed brick or tile, which glaze has become crazed, will have its exterior appearance materially and often irreparably affected.

Failure to find a satisfactory glaze composition which will withstand the elements without any deleterious effects has been a stumbling block to the development and use of colored bricks and tile.

Structures having painted exterior brick surfaces are common throughout the countries of the world. While the structures have a pleasing appearance for a short time after the application of the paint, the paint soon begins to crack and peel and the structures assume an ungainly appearance. The cost of constantly repainting them is prohibitive and thus, unfortunately, many of them retain their shabby appearance for many years.

A solution to this problem would be the manufacture and availability of structural clay products including bricks, tiles, terra cotta, sewer pipes and the like which had at least one surface coated with a clear transparent glaze or with a glaze of a particular color, be it red, green, blue, etc., including any varying shades or tints, which glaze would permanently adhere to the structural clay product and assure the purchaser of a structure which would retain its appearance for many years without fear of crazing and subsequent destruction of the glossy, smooth continuous vitreous film. Since structural clay products are usually inexpensive, it is important that the cost of applying a glaze on the surfaces thereof, be it colorless or colored, be kept as low as possible in order to permit the products to compete with other basic building units, such as wood, metal and the like.

While glaze compositions for structural clay products have been attempted in the past, they have been unsuccessful in the main. Either they form glazes which have "pin-holes" or which are subject to crazing when exposed to the varying atmospheric conditions normally encountered in any geographical area, or the cost of forming a somewhat suitable glaze to the clay product prices the product out of the competitive field.

In most conventional glazing processes, it is necessary to fuse a portion of the glaze formula to make a "frit" which is then ground to a powder and used as a glaze ingredient. This process of fritting is relatively expensive and materially increases the cost of applying a glazing composition to the relatively inexpensive structural clay products.

Accordingly, it is an object of this invention to provide a glazing composition which may be applied to the surface of a structural clay product and be permanently fused thereto as a smooth, glossy vitrified film at a temperature of 1700 to 1950° F. within which the clay product is ordinarily fired, which film is free of defects and suitable for the various modes of design which an architect or engineer may visualize for the product.

Another object of this invention is to provide an inexpensive glazing composition which may be applied to at least one surface of a fired or unfired structural clay product, and the composition of the glaze, fritted or unfritted, when fired onto the surface will form a glossy, smooth, continuous vitrified film thereon, either transparent or colored, which is non-crazing and also is resistant to the usual atmospheric elements.

Still another object is to provide a glazing composition which does not react too vigorously with the brick or tile during the firing operation so that the basic color of the brick is unchanged and also which has a coefficient of expansion which closely matches the coefficient of expansion of the brick or tile so that crazing or cracking of the glaze will not occur during cooling of the ware or later when the bricks or tiles are placed in service.

Another object of this invention is to produce glazing compositions of various colors, tints, and shades which may be applied to structural clay products and thus enhance the ornamental appearance of the products.

Still another object of this invention is to provide an inexpensive glazing composition from a plurality of ingredients, most of which are found abundantly in the raw state, such as ores, and may be used directly in this state without any further purification thereof being necessary.

A further object of this invention is to apply and fire a glaze onto a structural clay product, by using kilns ordinarily used in the manufacture of these clay products and at the temperatures of 1700 to 1950° F., without need for special kilns or higher temperatures, both of which factors would materially affect the cost of the finished products.

In attaining the objects of this invention, one feature resides, in mixing a plurality of minerals, metallic oxides, and other salts, preferably in the raw state, in particular proportions to produce a glazing composition having the desired characteristics.

Still another feature resides in mixing several of the oxides together, calcining them, and adding to the calcined mixture the remaining oxides, the resulting composition, when applied to the surface of a red burning structural clay product and fired at a temperature of 1700° to 1950° F. forming a glaze having the desired characteristics.

A satisfactory glazing composition must have a proper balance of basic characteristics such as: fusibility, thermal-expansion and durability. It has been found that inexpensive, substantially lead-free glazes can be produced which will meet all of the requirements of a satisfactory glaze for structural clay products. While a small amount of lead oxide may be present in the glaze, care must be taken that this amount is kept to a minimum. Otherwise, a clear, transparent glaze will react with red burning structural clay products to give brown colors not acceptable to the trade. Silica and alumina form the refractory constituents of the glaze and fluxes are added thereto to permit fusing of the glaze on the surface of the structural clay product. Alkalis are the most effective fluxes and included are the oxides of sodium, potassium and lithium. It is essential that lithium be present in the glazing composition of this invention since it materially promotes the fusibility properties of the glaze.

The following example of a particular glazing composition of the invention is merely illustrative of a composition coming within the scope of the invention but is not necessarily a limitation thereof.

*Example 1*

| Constituent | Approximate Formula | Weight (Percent) |
|---|---|---|
| Flint | $SiO_2$ | 25.0 |
| Kaolinitic Clay | $Al_2O_3.2SiO_2.2H_2O$ | 3.6 |
| Talc | $3MgO.4SiO_2.H_2O$ | 3.6 |
| Barium Carbonate | $BaCO_3$ | 22.6 |
| Nepheline Syenite | $0.7Na_2O.0.3K_2O.Al_2O_3.4.5SiO_2$ | 13.5 |
| Colemanite | $2CaO.3B_2O_3.5H_2O$ | 17.6 |
| Lepidolite | $LiF.KF.Al_2O_3.3SiO_2$ | 14.1 |

A two kilogram batch was made up from the weighed constituents and transferred to a gallon-size ball mill, one-third filled with porcelain grinding balls. The batch was made by mixing the flint, talc, kaolinitic clay and calcium carbonate, calcining the mixture at a temperature of 1700° F. then adding the remaining three ingredients thereto. A liter of water was added to the charge and the batch was allowed to mix and grind for about eight hours. The resulting smooth "creamy" consistency of the batch was adjusted, when necessary, with further small water additions to obtain the right fluidity for spraying. It must be understood that the composition may also be applied to the surfaces of the structural clay products by any other known method.

A DeVilbis spray gun was used operating under 25 pounds gauge air pressure. The glaze batch was then sprayed onto a series of plaques and oven dried at 220° F. for one hour. The plaques were originally cut from fired brick and three types of surfaces were available for spraying, namely, smooth cut surfaces, rough sanded and unsanded exterior surfaces. Also, samples of unfired, rough textured brick were sprayed and then fired.

The plaques thus treated were divided into two groups. The first group was fired to 1832° F. and the second group to 1922° F., both for twelve hours. No differences could be detected between the clear, smooth transparent glazes on the two sets of plaques. All of the plaques had a glossy, smooth, continuous, clear glaze over the three types of brick surfaces and no pin-holing or crazing was apparent thereon.

Several different colored glaze batches were compounded, each consisting of the clear glaze composition of Example 1, above, plus a glaze stain as an additive. Black, blue, yellow, brown, crimson and white stains were added to the batch of Example 1 in amounts of 10% by weight of solids.

The stain powder was added to each batch in a pint-size ball mill and thoroughly mixed by ball-milling for three hours. The black, brown and yellow glazes were fired to 1922° F. for a period of twelve hours. A satisfactory glaze having no pin-holing or crazing was achieved on each specimen.

The remaining color glazings were carried out at a firing temperature of 1832° F. for twelve hours. All the colors were used in connection with the glazing of smooth surfaced plaques. Four colors, namely, blue, brown, crimson, and yellow were also applied to the rough sanded plaque surfaces and two colors, black and white, were further applied to the unsanded rough textured plaque surfaces.

All of the glazes had a smooth, glossy continuous surface with no crazing or pinholing being apparent. When examined several months later, the glaze was unchanged on each plaque. The type of plaque surface did not affect the appearance of the glazes, all glazes being more than satisfactory.

While the stains were used in proportions of 10% by weight in the above example, this amount may vary between 4 to 15% by weight of solids.

It has been found that a satisfactory glaze composition may be formed when the ingredients are present within the following specified proportions.

| Constituent | Approximate Formula | Weight (Percent) |
|---|---|---|
| Flint | $SiO_2$ | 25.0 |
| Kaolinitic Clay | $Al_2O_3.2SiO_2.2H_2O$ | 3.6 |
| Talc | $3MgO.4SiO_2.H_2O$ | 3.6 |
| Barium Carbonate | $BaCO_3$ | 22.6 |
| Nepheline Syenite | $0.7Na_2O.0.3K_2O.Al_2O_3.4.5SiO_2$ | 5.0-25 |
| Colemanite | $2CaO.3B_2O_3.5H_2O$ | 5.0-30 |
| Lepidolite | $LiF:KF.Al_2O_3.3SiO_2$ | 5.0-20 |

Additional tests were conducted with glaze compositions having varying amounts of the latter three ingredients, as follows:

| Constituent | Example II Weight (Percent) | Example III Weight (Percent) | Example IV Weight (Percent) |
|---|---|---|---|
| Flint | 25.0 | 25.0 | 25.0 |
| Kaolinitic Clay | 3.6 | 3.6 | 3.6 |
| Talc | 3.6 | 3.6 | 3.6 |
| $BaCO_3$ | 22.6 | 22.6 | 22.6 |
| Nepheline Syenite | 5.0 | 13.5 | 22.6 |
| Colemanite | 26.1 | 5.0 | 17.6 |
| Lepidolite | 14.1 | 26.7 | 5.0 |

The first four listed constituents in each example were mixed, and then calcined at a temperature of 1832° F. The remaining three ingredients were added in the amounts indicated and the glaze compositions prepared in accordance with the method described in Example 1. The compositions were then sprayed onto dry, unfired brick and the coated bricks were fired at a temperature of 1832° F. for twelve hours.

Bricks coated with the compositions of Examples II and IV produced satisfactory, clear, transparent, glossy, continuous glazes, free from pinholing and crazing. Bricks coated with the composition of Example III had opaque glazes thereon (with a resulting loss of gloss) due to use of more than about 20% lepidolite in the composition.

It has been found that glazes in accordance with the invention are produced when the percent by weight of the flint, kaolinitic clay, talc and barium carbonate are as indicated in the above examples, although it is possible under certain conditions, to omit the calcining of the kaolinitic clay and talc and add them to the mixture after the flint and barium carbonate have been calcined. Also, while it is preferred to use the ingredients in the proportions illustrated above and made in accordance with the process described in Example I, some control of the glazes produced by the invention may be had by adjusting the ratio of the calcined materails to the uncalcined materials. In the above examples the ratio is 54.8% calcined to 45.2% uncalcined, by weight. Some latitude is possible and if lower firing temperatures are sometimes required, it would be possible to do this by lowering somewhat the calcined material and raising the uncalcined constituents. The ratio of flint to barium carbonate in the calcine can also be varied to control the thermal expansion co-efficient of the final glaze.

While the nepheline syenite, colemanite and lepidolite should be within the ranges of about 5–25%, 5–30% and 5–20%, respectively, by weight, it is to be understood that a slight change in amount of any of these ingredients, for example, 4.75% instead of 5%, would very likely produce a satisfactory glaze in accordance with the invention. Thus, while the invention is being claimed in terms of the proportions set forth in the application, it is to be understood that slight variations in the described proportions are included as coming within the scope of the claimed invention.

Having described the invention, what is claimed is:

1. A glazing composition for structural clay products and fusible therewith at a temperature not higher than 1950° F. to produce a smooth, glossy, continuous vitrified film thereon which is non-crazing and free from "pin-holes" consisting essentially of 25% flint, 3.6% kaolinitic clay, 3.6% talc, 22.6% barium carbonate, 5 to 25% nepheline syenite, 5 to 30% colemanite and 5 to 20% lepidolite, said percentages being by weight.

2. A glazing composition as defined in claim 1 having added thereto from 4–15% by weight of a coloring pigment.

3. A glazing composition as defined in claim 1 having added thereto 10% by weight of a coloring pigment.

4. A glazing composition for structural clay products and fusible therewith at a temperature not higher than 1950° F. to produce a smooth, glossy, continuous vitrified film thereon which is non-crazing and free from "pin-holes" consisting essentially of the following in percents by weight; flint 25%, kaolinitic clay 3.6%, talc 3.6%, barium carbonate 22.6%, nepheline syenite 13.5%, colemanite 17.6%, and lepidolite 14.1%.

5. The process for forming a smooth, glossy, non-crazing, non-pinholing glaze on a structural clay product comprising the steps of mixing 25% by weight of flint, 3.6% by weight of kaolinitic clay, 3.6% by weight of talc and 22.6% by weight of barium carbonate, calcining said mixture and adding to the formed calcined mixture from 5 to 25% by weight of nepheline syenite, 5–30% by weight of colemanite and 5–20% by weight of lepidolite, adding sufficient water to the resulting mixture to form a suspension, applying said suspension to the surface of said structural clay product and firing said coated product to a temperature not higher than 1950° F. until said glaze is formed thereon.

6. The process for forming a smooth, glossy, non-crazing, non-pinholing glaze on a structural clay product comprising the steps of mixing 25% by weight of flint, 3.6% by weight of kaolinitic clay, 3.6% by weight of talc, and 22.6% by weight of barium carbonate, calcining said mixture and adding to the formed calcined mixture 13.5% by weight of nepheline syenite, 17.6% by weight of colemanite and 14.1% by weight of lepidolite, adding sufficient water to the resulting mixture to form a suspension, applying said suspension to the surface of said structural clay product and firing said coated product to a temperature not higher than 1950° F. until said glaze is formed thereon.

7. A structural clay product having a smooth, glossy, continuous vitrified glaze thereon free from pinholes or crazing, said glaze consisting essentially of 25% by weight of flint, 3.6% by weight of kaolinitic clay, 3.6% by weight of talc, 22.6% by weight of barium carbonate, from 5 to 25% by weight of nepheline syenite, from 5 to 30% by weight of colemanite, and from 5 to 20% by weight of lepidolite.

8. The structural clay product as defined in claim 7 wherein said glaze contains from 4 to 15% by weight of a coloring pigment.

9. A structural clay product having a smooth, glossy, continuous vitrified glaze thereon free from pinholes or crazing, said glaze consisting essentially of 25% by weight of flint, 3.6% by weight of kaolinitic clay, 3.6% by weight of talc, 22.6% by weight of barium carbonate, 13.5% by weight of nepheline syenite, 17.6% by weight of colemanite and 14.1% by weight of lepidolite.

10. The structural clay product as defined in claim 9 wherein said glaze contains 10% by weight of a coloring pigment.

References Cited in the file of this patent
UNITED STATES PATENTS

| | | |
|---|---|---|
| 2,159,349 | Bennett | May 23, 1939 |
| 2,334,319 | Erdle | Nov. 16, 1943 |
| 2,726,964 | Smoke | Dec. 13, 1955 |
| 2,741,008 | Snoody | Apr. 10, 1956 |

OTHER REFERENCES

"Ceramic Glazes" by Parmelee, pub. 1951 by Industrial Publications, Inc., Chicago, Ill. Copy in Sci. Lib.